United States Patent
Cornelisse

(10) Patent No.: US 7,122,113 B2
(45) Date of Patent: Oct. 17, 2006

(54) METHOD FOR SOLUBILISING ASPHALTENES IN A HYDROCARBON MIXTURE

(75) Inventor: Pieter Marinus Willem Cornelisse, Amsterdam (NL)

(73) Assignee: Shell Oil Company, Houston, TX (US)

( * ) Notice: Subject to any disclaimer, the term of this patent is extended or adjusted under 35 U.S.C. 154(b) by 413 days.

(21) Appl. No.: 10/480,581

(22) PCT Filed: Jun. 12, 2002

(86) PCT No.: PCT/EP02/06583

§ 371 (c)(1),
(2), (4) Date: Dec. 12, 2003

(87) PCT Pub. No.: WO02/102928

PCT Pub. Date: Dec. 27, 2002

(65) Prior Publication Data

US 2004/0163995 A1    Aug. 26, 2004

(30) Foreign Application Priority Data

Jun. 14, 2001 (EP) ................................ 01202294

(51) Int. Cl.
*C10G 75/04* (2006.01)
*C10L 1/22* (2006.01)

(52) U.S. Cl. .................. 208/48 AA; 208/39; 208/585; 208/950

(58) Field of Classification Search .......... 208/48 AA, 208/39; 585/950
See application file for complete search history.

(56) References Cited

U.S. PATENT DOCUMENTS

| 3,244,188 A | 4/1966 | Parks et al. .................. 137/15 |
| 3,578,421 A | 5/1971 | Andress, Jr. et al. .......... 44/62 |
| 3,965,027 A | 6/1976 | Boffardi et al. ............. 252/180 |
| 4,018,702 A | 4/1977 | Boffardi et al. ............. 252/289 |
| 5,425,422 A | 6/1995 | Jamaluddin et al. |
| 5,648,575 A | 7/1997 | Klomp et al. |
| 5,788,722 A * | 8/1998 | Emert et al. .................. 44/331 |
| 5,879,561 A | 3/1999 | Klomp et al. |
| 5,900,516 A | 5/1999 | Talley et al. |
| 5,998,565 A | 12/1999 | de Brabander-van den Berg et al. ........................... 528/176 |
| 6,093,684 A | 7/2000 | Loree |
| 6,180,683 B1 | 1/2001 | Miller et al. |
| 6,368,422 B1 * | 4/2002 | Breuer et al. ................. 134/40 |
| 6,369,004 B1 | 4/2002 | Klug et al. ................... 507/90 |
| 6,544,392 B1 | 4/2003 | Downes ..................... 204/242 |
| 6,946,524 B1 * | 9/2005 | Breuer et al. ............... 525/242 |

FOREIGN PATENT DOCUMENTS

| EP | 0 736 130 | 7/1998 |
| EP | 0 824 631 | 7/1999 |
| NL | 9200043 | 1/1992 |
| WO | 88/01180 | 2/1988 |
| WO | 93/14147 | 7/1993 |
| WO | 93/25798 | 12/1993 |
| WO | 97/19987 | 6/1997 |
| WO | 98/05745 | 2/1998 |
| WO | 99/13197 | 3/1999 |
| WO | 99/16810 | 4/1999 |
| WO | 00/56804 | 9/2000 |
| WO | 00/58388 | 10/2000 |

* cited by examiner

*Primary Examiner*—Tam M. Nguyen
(74) *Attorney, Agent, or Firm*—William E. Hickman

(57) ABSTRACT

Method for solubilising asphaltenes in an asphaltenes-containing hydrocarbon mixture by adding thereto an effective amount of a dendrimeric compound, and a hydrocarbon mixture comprising, in addition to hydrocarbons, asphaltenes and at least one dendrimeric compound. Preferably, the dendrimeric compound is a hyperbranched polyester amide, more preferably a polyester amide built up from succinic anhydride, diisopropanolamine, functionalised with poly (isobutenyl) succinic anhydride.

18 Claims, No Drawings

METHOD FOR SOLUBILISING ASPHALTENES IN A HYDROCARBON MIXTURE

The present application claims priority on European Patent Application 01202294.3 filed on 14 Jun. 2001.

The present invention relates to a method for solubilising asphaltenes in a hydrocarbon mixture.

Asphaltenes are defined as aromatic hydrocarbons that are insoluble in n-heptane. Asphaltenes are generally determined in accordance with the standard of the American Society for Testing and Materials ASTM D6560. They tend to be polar molecules that aggregate together through aromatic orbital association, hydrogen bonding and acid-base interactions. Asphaltenes can deposit as solid deposits or dark sludge anywhere in the oil production industry. They may cause problems in oil recovery and oil refining processes. In recovery processes asphaltenes deposits may block the pores of the formation and/or reduce the flow of oil from the well by blockage of the well equipment. Such blockage or reduction of flow may also occur in the transport of asphaltenes-containing oil from the production location to the refinery, e.g., by pipelines.

BACKGROUND OF THE INVENTION

In a refinery asphaltenes deposits may block transport at the refinery, or block catalysts that may be used in the relevant refinery processes.

Hence, it is evident that it is desirable to find a method to solubilise asphaltenes in oil, i.e. hydrocarbon mixtures.

In U.S. Pat. No. 5,425,422 a method is described in which asphaltenes deposits in a well bore are removed by injection of a deasphalted oil in order to solubilise the asphaltenes. In the process of U.S. Pat. No. 6,093,684 asphaltenes and waxes are dissolved by employing a specific aromatic fraction of a crude oil.

SUMMARY OF THE INVENTION

It has now surprisingly been found that asphaltenes can be dissolved by employing an additive in the asphaltenes-containing hydrocarbon mixture. Accordingly, the present invention provides a method for solubilising asphaltenes in an asphaltenes-containing hydrocarbon mixture by adding thereto an effective amount of a dendrimeric compound. Hence, the present invention also provides a hydrocarbon mixture comprising, in addition to such hydrocarbons, asphaltenes and at least one dendrimeric compound.

DETAILED DESCRIPTION OF THE PREFERRED EMBODIMENT

Dendrimeric compounds are in essence three-dimensional, highly branched oligomeric or polymeric molecules comprising a core, a number of branching generations and an external surface composed of end groups. A branching generation is composed of structural units, which are bound radially to the core or to the structural units of a previous generation and which extend outwards. The structural units have at least two reactive mono-functional groups and/or at least one mono-functional group and one multifunctional group. The term multifunctional is understood as having a functionality of 2 or higher. To each functionality a new structural unit may be linked, a higher branching generation being produced as a result. The structural units can be the same for each successive generation but they can also be different. The degree of branching of a particular generation present in a dendrimeric compound is defined as the ratio between the number of branchings present and the maximum number of branchings possible in a completely branched dendrimer of the same generation. The term functional end groups of a dendrimeric compound refers to those reactive groups which-form part of the external surface. Branchings may occur with greater or lesser regularity and the branchings at the surface may belong to different generations depending on the level of control exercised during synthesis. Dendrimeric compounds may have defects in the branching structure, may also be branched asymmetrically or have an incomplete degree of branching in which case the dendrimeric compound is said to contain both functional groups and functional end groups.

Dendrimeric compounds as referred to hereinabove have been described in, inter alia, International Patent Application Publications Nos. WO 93/14147 and WO 97/19987 and in Dutch Patent Application No. 9200043. Dendrimeric compounds have also been referred to as "starburst conjugates", for instance in International Patent Application Publication No. WO 88/01180. Such compounds are described as being polymers characterised by regular dendrimeric (tree-like) branching with radial symmetry.

Functionalised dendrimeric compounds are characterised in that one or more of the reactive functional groups present in the dendrimeric compounds have been allowed to react with active moieties different from those featuring in the structural units of the starting dendrimeric compounds. These moieties can be selectively chosen such that, with regard to its ability to solubilise asphaltenes, the functionalised dendrimeric compound outperforms the dendrimeric compound.

The hydroxyl group is one example of a functional group and functional end group of a dendrimeric compound. Dendrimeric compounds containing hydroxyl groups can be functionalised through well-known chemical reactions such as esterification, etherification, alkylation, condensation and the like. Functionalised dendrimeric compounds also include compounds that have been modified by related but not identical constituents of the structural units such as different amines, which as such may also contain hydroxyl groups.

A preferred class of dendrimeric compounds capable of solubilising asphaltenes comprises the so-called hyperbranched polyesteramides, commercially referred to as HYBRANES (the word HYBRANE is a trademark). The preparation of such compounds has been described in more detail in International Patent Application Nos. WO-A-99/16810, WO-A-00/58388 and WO-A-00/56804. Accordingly, the dendrimeric compound is preferably a condensation polymer containing ester groups and at least one amide group in the backbone, having at least one hydroxyalkylamide end group and having a number average molecular weight of at least 500 g/mol. This class of polymers has a lower degree of branching than the poly(propylene imine) dendrimers described in WO-A-93/14147, but still retains the non-linear shape and the high number of reactive end groups, which are characteristic of dendrimeric compounds. Compounds belonging to this class of dendrimers are suitably produced by reacting a cyclic anhydride with an alkanolamine, giving rise to dendrimeric compounds by allowing them to undergo a number of (self-) condensation reactions leading to a predetermined level of branching. It is also possible to use more than one cyclic anhydride and/or more than one alkanolamine.

The alkanolamine may be a dialkanolamine, a trialkanolamine or a mixture thereof.

Examples of suitable dialkanolamines are 3-amino-1,2-propanediol, 2-amino-1,3-propanediol, diethanolamine bis (2-hydroxy-1-butyl)amine, dicyclohexanolamine and diisopropanolamine. Diisopropanolamine is particularly preferred.

As an example of a suitable trialkanolamine reference is made to tris(hydroxymethyl)amino methane or triethanolamine.

Suitable cyclic anhydrides comprise succinic anhydride, glutaric anhydride, tetrahydrophthalic anhydride, hexahydrophthalic anhydride, phthalic anhydride, norbornene-2,3-dicarboxylic anhydride, and naphthalenic dicarboxylic anhydride. The cyclic anhydrides may contain substituents, in particular hydrocarbon (alkyl or alkenyl) substituents. The substituents suitably comprise from 1 to 15 carbon atoms. In another embodiment the cyclic anhydride contains a polyalkenyl substituent. Suitably the alkene from which the polyalkylene chain has been built is an ethylenically unsaturated hydrocarbon containing from 2 to 10, preferably from 2 to 6 carbon atoms. The alkene is suitably ethene, propene, butene, isobutene, pentene or hexene. Most preferred is a poly(isobutenyl) chain as substituent. The chain may have various lengths. Good results are obtainable with substituents comprising from 6 to 50 alkene monomers. More preferred is a chain with from 10 to 40 alkene monomers. Suitable non-polymeric examples of substituted cyclic anhydrides include. 4-methylphthalic anhydride, 4-methyltetrahydro- or 4-methylhexahydrophthalic anhydride, methyl succinic anhydride and 2-dodecenyl succinic anhydride. Poly-(isobutenyl)succinic anhydride is especially preferred. Mixtures of anhydrides can also be used. In another preferred embodiment a mixture of succinic anhydride and poly(isobutenyl)succinic anhydride is used. The molar ratio between succinic anhydride to poly(isobutenyl)-succinic anhydride suitably ranges from 1:9 to 9:1, preferably from 2:3 to 9:1. The (self-)condensation reaction is suitably carried out without a catalyst at temperatures between 100 and 200° C. By carrying out such (self-)condensation reactions compounds will be obtained having amide-type nitrogen moieties as branching points and with hydroxyl end groups in the base polymer. Depending on the reaction conditions, predetermined molecular weight ranges and number of end groups can be set. For instance, using hexahydrophthalic anhydride and di-isopropanolamine polymers can be produced having a number average molecular weight tuned between 500 and 50,000, preferably between 670 and 10,000, more preferably between 670 and 5000. The number of hydroxyl groups per molecule in such case is suitably in the range between 0 and 13.

The functional end groups, in particular hydroxyl groups, of the polycondensation products can be modified by further reactions as disclosed in the above-mentioned applications WO-A-00/58388 and WO-A-00/56804. Suitable modification can take place by partial replacement of the alkanolamine by other amines, such as secondary amines, e.g. N,N-bis-(3-dimethylaminopropyl)amine, morpholine or non-substituted or alkyl-substituted piperazine, in particular N-methyl piperazine. The use of N,N-bis-(dialkylaminoalkyl)amines results in dendrimeric polymers that have been modified to have tertiary amine end groups. In particular the products prepared by the polycondensation of 2-dodecenyl succinic anhydride or hexahydrophthalic anhydride with di-isopropanolamine that have been modified by morpholine, tertiary amine or non-substituted or alkyl-substituted piperazine end groups are very suitable for use in the process of the present invention. A preferred type of modification can be obtained by reaction of at least part of the hydroxyl end groups with acids or acid anhydrides. In the present process it is preferred to modify the hydroxyl groups by a reaction with an organic acid or an acid anhydride, in particular with succinic anhydride, alkenyl succinic anhydride, hexahydrophthalic anhydride, coco fatty acid or lauric acid. Most preferably the acid or anhydride has an alkenyl substituent, such as dodecenyl. In another preferred embodiment an acid anhydride is used that contains a polyalkenyl substituent. Suitably the alkene from which the polyalkylene chain has been built is an ethylenically unsaturated hydrocarbon containing from 2 to 10, preferably from 2 to 6 carbon atoms. The alkene is suitably ethene, propene, butene, isobutene, pentene or hexene. Most preferred is a poly(isobutenyl) chain as substituent. The chain may have various lengths. Good results are obtainable with substituents comprising from 6 to 50 alkene monomers. More preferred is a chain with from 10 to 40 alkene monomers. Most preferred is a poly(isobutylene) chain as substituent to succinic acid anhydride. The poly(isobutenyl) chain, preferably, has the chain length as described above. In this way the dendrimeric compound contains hydroxyl functional groups and carboxylic functional groups.

Examples of commercially available HYBRANES are those of the types SVPC and SPIBC.

HYBRANE SVPC is a dendrimeric compound based on structural units composed of succinic anhydride and di-isopropanolamine in a molecular ratio of about 5:6, in which part of the functional hydroxyl groups have been modified by esterification with coco fatty acid and poly(isobutenyl) succinic anhydride.

HYBRANE SPIBC is a functionalised dendrimeric compound based on structural units composed of succinic anhydride and di-isopropanolamine wherein part of the functional hydroxyl groups has been modified by reaction with poly(isobutenyl) succinic anhydride.

The amount of the dendrimeric and functionalised dendrimeric compounds which can be used in the process according to the present invention is suitably in the range between 0.01 and 1.0% wt, preferably between 0.1 and 0.5% wt, based on the total of asphaltene-containing hydrocarbon mixture and dendrimeric compound.

The dendrimeric and functionalised dendrimeric compounds can be added to the hydrocarbon-mixture as their dry powder, or, preferably, in concentrated solution. The hydrocarbon-mixture is preferably a crude oil. However, the dendrimeric compounds of the present invention are also suitably used in the solubilisation of asphaltenes of refinery streams, in particular of thermally cracked hydrocarbon fractions.

It is also possible to add other oil-field chemicals such as corrosion and scale inhibitors to the mixture containing the dendrimeric and/or functionalised dendrimeric compounds. Suitable corrosion inhibitors comprise primary, secondary or tertiary amines or quaternary ammonium salts, preferably amines or salts containing at least one hydrophobic group. Examples of corrosion inhibitors comprise benzalkonium halides, preferably benzyl hexyldimethyl ammonium chloride.

The process will be illustrated by means of the following examples.

EXAMPLE 1

The effect of certain dendrimeric compounds was tested on two crude oils by means of an Asphaltene Dispersant Test. In this test a 50-fold excess of heptane was added to a mixture of a crude oil and the dendrimeric compound. The admixture obtained was left for one hour to allow precipi tation. An efficient dispersant will be able to keep the asphaltenes in suspension, thus keeping the liquid dark-coloured. In contrast, an inefficient dispersant will show more precipitate and a light-coloured liquid. This difference in colour is recorded by calorimetric measurements. The wavelength chosen was 570 nm. A dispersion parameter D was defined as $$\% D = 100\{1-(\% T_{sx}/\% T_{blank})\},$$

wherein $\% T_{sx}$ is the transmittance through the solution of oil, heptane and dendrimeric compound, and $\% T_{blank}$ is the transmittance through the solution of oil and heptane, without the dendrimeric compound. The greater the value of % D is, the more efficient is the compound.

The test was performed on two different crude oils, Oil 1 was a Venezuelan crude oil, and Oil 2 was a North Sea crude oil.

The test was performed using two different dendrimeric compounds.

Compound 1 was HYBRANE SVPC 152050, a dendrimeric compound based on structural units composed of succinic anhydride and di-isopropanolamine, wherein 50% of the end hydroxyl groups as reacted with poly(isobutenyl) succinic anhydride and 20% of the hydroxyl end groups was reacted with coco fatty acid.

Compound 2 was HYBRANE SVPC 152020, a dendrimeric compound based on structural units composed of succinic anhydride and di-isopropanolamine wherein 20% of the end hydroxyl groups was reacted with poly(isobutenyl) succinic anhydride and also 20% was esterified by reaction with coco fatty acid. The poly(isobutenyl) chain in both compounds comprised about 22 isobutylene units per chain.

The tests were carried out on 4 ml of oil to which 8 µl of a 50%-solution of the dendrimeric compound in toluene was added. To allow for a correct comparison, tests were also conducted on the oils without any addition and on 4 ml of the oils with addition of 8 µl of toluene. The results of the tests are shown in Table I below.

TABLE I

| Oil | Blank | 2000 ppmw Toluene | 1000 ppmw Compound 1 1000 ppmw toluene | 1000 ppmw Compound 2 1000 ppmw toluene |
|---|---|---|---|---|
| 1 | — | 3.8 | 87.9 | 21.1 |
| 2 | — | 1.9 | 20.6 | 14.9 |

This table shows that the dendrimeric compounds have a significant solubilising effect on asphaltenes in crude oil.

EXAMPLE 2

A similar test was carried out with six other compounds.

The compounds are types of HYBRANE SPIBC, and are composed of a dendrimeric compound based on structural units composed of succinic anhydride and di-isopropanolamine, wherein between 20 and 75% of the end hydroxyl groups were modified by reaction with poly(isobutenyl) succinic anhydride. The poly(isobutenyl) chain contained about 22 isobutylene monomers. Table II shows the percentage of the hydroxyl groups that were modified and the number average molecular weight (Mn) of the compounds that have been used.

The test were conducted on Oil 1, wherein 5 ml of oil was mixed with 5 µl of dendrimeric compound, and wherein 100 µl of the oil mixture obtained was treated with 10 ml of heptane, yielding a compound concentration of about 1000 ppmw. The results of the tests after one hour are shown in Table II.

TABLE II

| Compound No. | Mn | No. hydroxyl groups modified | % D |
|---|---|---|---|
| 3 | 5500 | 50 | 88.8 |
| 4 | 7200 | 75 | 88.1 |
| 5 | 2400 | 20 | 90.1 |
| 6 | 1950 | 20 | 82.0 |
| 7 | 1300 | 20 | 90.1 |
| 8 | 3450 | 50 | 84.0 |

The results indicate that dendrimeric compounds 3 to 8 have significant asphaltene-solubilising effect.

While the illustrative embodiments of the invention have been described with particularity, it will be understood that various other modifications will be readily apparent to, and can be easily made by one skilled in the art without departing from the spirit of the invention. Accordingly, it is not intended that the scope of the following claims be limited to the examples and descriptions set forth herein but rather that the claimsbe construed as encompassing all features which would be treated as equivalents thereof by those skilled in the art to which this invention pertains.

I claim:

1. Method for solubilising asphaltenes in an asphaltenes-containing hydrocarbon mixture by adding thereto an effective amount of a dendrimeric compound, the dendrimeric compound comprises a hyperbranched polyester amide.

2. The method according to claim 1, in which the dendrimeric compound is functionalised.

3. The method according to claim 1, in which the hyperbranched polyester amide is used which is based on (self-)condensation reactions between a cyclic anhydride and a di-or trialkanolamine.

4. The method according to claim 1, in which a hyperbranched polyester amide is used having a number average molecular weight between 500 and 50,000.

5. The method according to claim 3, in which the cyclic anhydride is selected from the group consisting of succinic anhydride, glutaric anhydride, tetrahydrophthalic anhydride, hexahydrophthalic anhydride, phthalic anhydride, norbornene-2,3-dicarboxylic anhyd ride, naphthalenic dicarboxylic anhydride, optionally substituted by one or more alkyl or alkenyl substituents.

6. The method according to claim 3, in which the alkanolamine is diisopropanolamine.

7. The method according to claim 3, in which the polyester amide has been functionalised by a reaction with an acid or acid anhydride.

8. The method according to claim 7, in which the polyester amide has been functionalised with a polyalkenyl succinic anhydride.

9. The method according to claim 8, in which the polyalkenyl succinic anhydride comprises a polyalkenyl chain that has been built up of 6 to 50 alkene monomers.

10. The method according to claim 1, in which between 0.01 and 1 .0% wt of the dendrimeric compound is added to the mixture, based on the total of asphaltene-containing hydrocarbon mixture and dendrimeric compound.

11. The method according to claim 1, in which the hydrocarbon mixture is a crude oil.

12. The method according to claim 4, in which the cyclic anhydride is selected from the group consisting of succinic anhydride, glutaric anhydride, tetrahyd rophthalic anhydride, hexahydrophthalic anhydride, phthalic anhydride, norbornene-2,3-dicarboxylic anhydride, naphthalenic dicarboxylic anhydride, optionally substituted by one or more alkyl or alkenyl substituents.

13. The method according to claim 4, in which the alkanolamine is dilsopropanolamine.

14. The method according to claim 5, in which the alkanolamine is diisopropanolamine.

15. The method according to claim 4, in which the polyester amide has been functionalised by a reaction with an acid or acid anhydride.

16. The method according to claim 5, in which the polyester amide has been functionalised by a reaction with an acid or acid anhydride.

17. The method according to claim 6, in which the polyester amide has been functionalised by a reaction with an acid or acid anhydride.

18. The method according to claim 8, in which the polyalkenyl succinic anhydride is a poly(isobutenyl) succinic anhydride.

* * * * *